United States Patent
McMichael et al.

(10) Patent No.: US 8,975,341 B2
(45) Date of Patent: Mar. 10, 2015

(54) PROCESS FOR ATTACHING A MODIFYING AGENT TO A SUBSTRATE

(75) Inventors: James W. McMichael, Lake Jackson, TX (US); Jorg Theuerkauf, Lake Jackson, TX (US); Bruce D. Hook, Lake Jackson, TX (US); Malcolm F. Finlayson, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 1015 days.

(21) Appl. No.: 13/121,313

(22) PCT Filed: Aug. 31, 2009

(86) PCT No.: PCT/US2009/055521
§ 371 (c)(1),
(2), (4) Date: Mar. 28, 2011

(87) PCT Pub. No.: WO2010/039380
PCT Pub. Date: Apr. 8, 2010

(65) Prior Publication Data
US 2011/0178243 A1  Jul. 21, 2011

Related U.S. Application Data

(60) Provisional application No. 61/101,469, filed on Sep. 30, 2008.

(51) Int. Cl.
| | |
|---|---|
| *C08F 8/00* | (2006.01) |
| *B05D 3/04* | (2006.01) |
| *C08J 3/22* | (2006.01) |
| *C08J 3/205* | (2006.01) |
| *C08K 5/43* | (2006.01) |

(52) U.S. Cl.
CPC ............... *C08J 3/226* (2013.01); *C08J 3/2053* (2013.01); *C08J 2400/14* (2013.01); *C08J 2423/00* (2013.01); *C08K 5/43* (2013.01)
USPC ........ 525/333.9; 525/54.1; 427/222; 427/377

(58) Field of Classification Search
None
See application file for complete search history.

(56) References Cited

U.S. PATENT DOCUMENTS

| | | | | |
|---|---|---|---|---|
| 3,336,268 | A | * | 8/1967 | Cox .............................. 525/211 |
| 3,377,415 | A | | 4/1968 | Oppenlander |
| 3,530,108 | A | | 9/1970 | Oppenlander |
| 3,893,989 | A | | 7/1975 | Leicht et al. |
| 4,113,802 | A | | 9/1978 | Matteoli et al. |
| 6,776,924 | B2 | | 8/2004 | Walters et al. |
| 2002/0052450 | A1 | | 5/2002 | Walters et al. |

FOREIGN PATENT DOCUMENTS

| | | | |
|---|---|---|---|
| GB | 1068057 | | 5/1967 |
| GB | 1068057 | * | 10/1967 ............. C08F 27/00 |
| JP | S49-106551 A | | 10/1974 |
| JP | 56021815 | | 2/1981 |
| JP | H11-172011 A | | 6/1999 |
| WO | 9307209 | | 4/1993 |
| WO | 9910424 | | 3/1999 |

* cited by examiner

*Primary Examiner* — Ling Choi
*Assistant Examiner* — Chun-Cheng Wang
(74) *Attorney, Agent, or Firm* — Whyte Hirschboeck Dudek S.C.

(57) ABSTRACT

Modifying agents, e.g., a poly(sulfonyl) azide, are attached to a substrate surface, e.g., the surface of a polyolefin particle, by a process comprising the steps of: A. Contacting in an open contact zone and under a flow of inert gas a substrate with a modifying agent, binding agent, e.g., a phenolic-based antioxidant, and a liquid mixing agent, e.g., methylene chloride, to form a substrate mixture; B. Closing the contact zone and stopping the flow of inert gas to the contact zone; C. Agitating the substrate mixture under the inert gas in the closed contact zone to commence evaporation of the liquid mixing agent; D. Reducing the temperature and pressure of the closed contact zone while continuing to agitate the substrate mixture; and E. Completing the substantial evaporation of the mixing agent from the substrate mixture by opening the contact zone and initiating an inert gas flow while continuing agitation of the substrate mixture and maintaining a reduced pressure.

18 Claims, 3 Drawing Sheets

PROCESS FOR ATTACHING A MODIFYING AGENT TO A SUBSTRATE

CROSS REFERENCE TO RELATED APPLICATION

The present application claims priority to U.S. patent application Ser. No. 61/101,469 filed on Sep. 30, 2008, the entire content of which is incorporated by reference herein.

FIELD OF THE INVENTION

This invention relates to modifying agents. In one aspect, the invention relates to a process for attaching a modifying agent, e.g., a coupling agent such as a poly(sulfonyl) azide, to a substrate, e.g., a polyolefin, while in another aspect, the invention relates to a process in which the modifying agent is attached to the substrate with the assistance of a binding agent, e.g., an antioxidant. In yet another aspect, the invention relates to the substrate-with-attached-modifying agent made by the process.

BACKGROUND OF THE INVENTION

Polyolefins and other polymers are frequently modified in order to improve their rheological and other physical properties. Various agents and techniques have been used to carry out such modifications. One such technique is the "coupling" together of polymer chains.

One method for coupling polymers, such as polyolefins, is to use a coupling agent, i.e., a molecule that is capable of providing a nitrene and/or carbene reactive group for insertion into a carbon-hydrogen bond (C—H) in the polymers. One such a class of agents is the sulfonyl azides which are described in WO 99/10424. When heated to an appropriate temperature, these azides react to form nitrene groups that can then insert into one or more C—H bonds in the polymers.

However, the sulfonyl azides (and other modifying agents for that matter) can be shock sensitive, i.e., they can react in response to shock or other external influences. Accordingly, a modifying agent may require protection against shock during its manufacture, processing, shipping and/or use. One such method is phlegmatization, i.e., combining the agent with another compound that is inert or less sensitive to shock and thus diluting the effect of any shock on the modifying agent. In these combinations the modifying agent is typically attached to a substrate (also known as a carrier) through a coating or precipitation process. However, these processes often produce a product in which the modifying agent is poorly attached to the carrier and/or the modifying agent forms in large crystals on the carrier which are then susceptible to easy breakage or other forms of attrition from the substrate. In turn, this can result in free, i.e., unattached, modifying agent mixed with the carrier, and such a modifying agent is much more susceptible to reaction from shock than a modifying agent that is securely bound to the substrate.

SUMMARY OF THE INVENTION

In one embodiment the invention is a process for attaching a modifying agent to a substrate surface, the process comprising the steps of:
A. Contacting in an open contact zone and under a flow of inert gas a substrate that has a BET surface area of less than one square meter per gram ($m^2/g$) with a modifying agent, binding agent and a liquid mixing agent to form a substrate mixture;
B. Closing the contact zone and stopping the flow of inert gas to the contact zone;
C. Agitating the substrate mixture under the inert gas in the closed contact zone to commence evaporation of the liquid mixing agent;
D. Reducing the temperature and pressure of the closed contact zone while continuing to agitate the substrate mixture; and
E. Completing the substantial evaporation of the mixing agent from the substrate mixture by opening the contact zone and initiating an inert gas flow while continuing agitation of the substrate mixture and maintaining a reduced pressure.

The process of this embodiment produces a semi-crystalline coating of modifying agent and binding agent on the substrate surface. In one embodiment the amount of binding agent in the coating is at least 5, preferably at least 10, percent of the coating weight. In one embodiment the modifying agent, binding agent and mixing agent are mixed together in any order prior to contact with the substrate. In one embodiment, the modifying agent, binding agent and mixing agent are contacted in any order with the substrate. In one embodiment the modifying agent is made in situ in either the preparation of a pre-mix of modifying agent, binding agent and mixing agent, or during its contact with the substrate. In one embodiment, the modifying agent is a poly(sulfonyl) azide. In one embodiment, the substrate is a polyolefin, e.g., a polyethylene, polypropylene, polystyrene, etc. In one embodiment, the mixing agent is an organic polar solvent, e.g., methylene chloride, chloroform, toluene, acetone, etc. In one embodiment, the binding agent is an antioxidant, e.g., a hindered phenolic compound. In one embodiment the contact zone is a mixer and the inert gas is nitrogen. In one embodiment the invention is the substrate-with-attached modifying agent made by the process described in this paragraph.

In one embodiment the invention is a process for attaching a modifying agent to a substrate surface, the process comprising the steps of:
A. Contacting in an inert gas atmosphere a substrate with a modifying agent, an optional binding agent, and a liquid mixing agent to form a first substrate mixture;
B. Evaporating at least a part of the liquid mixing agent while agitating the first substrate mixture under an inert gas flow or a partial vacuum to form a semi-crystalline coating of modifying agent on the substrate surface;
C. Contacting the modifying agent semi-crystalline coating on the substrate surface with additional mixing agent to remove at least a portion of the coating from the substrate surface and to form a second substrate mixture comprising removed modifying agent, substrate and additional mixing agent;
D. Agitating the second substrate mixture under an inert gas flow or a partial vacuum to form a semi-crystalline coating of the removed modifying agent on the substrate surface; and
E. Recovering the substrate with the modifying agent coating.

In one embodiment the substrate has a BET surface area of at least 1 $m^2/g$. In one embodiment the substrate has a BET surface area of less than 1 $m^2/g$. In one embodiment the modifying agent and mixing agent are mixed together prior to contact with the substrate. In one embodiment, the modifying agent and mixing agent are contacted in any order with the substrate. In one embodiment the modifying agent is made in situ in either the preparation of a pre-mix of modifying agent and mixing agent, or during its contact with the substrate. In one embodiment the substrate is also contacted with an optional binding agent. In one embodiment the process includes the additional step of increasing the temperature under which the second substrate mixture is agitated prior to recovering the substrate with a modifying agent coating. In one embodiment, the modifying agent is a poly(sulfonyl) azide. In one embodiment, the substrate is a polyolefin, e.g., a polyethylene, polypropylene, polystyrene, etc. In one embodiment, the mixing agent is an organic polar solvent, e.g., methylene chloride, chloroform, toluene, acetone, etc. In one embodiment the invention is the substrate-with-attached modifying agent made by the process described in this paragraph. The largest of the crystallites in the coating of the recovered substrate (Step E) are smaller than the largest of the crystallites in the coating made from the first substrate mixture (Step B).

In one embodiment the invention is a process for attaching a modifying agent to a substrate surface, the process comprising the steps of:

A. Contacting in an inert gas atmosphere a substrate that has a BET surface area of at least one square meter per gram ($m^2/g$) with a modifying agent, an optional binding agent, and a liquid mixing agent to form a first substrate mixture;

B. Evaporating at least a part of the mixing agent while agitating the first substrate mixture under a partial vacuum to form a semi-crystalline coating of modifying agent on the substrate surface;

C. Contacting the modifying agent semi-crystalline coating on the substrate surface with additional mixing agent to remove at least a portion of the coating from the substrate surface and to form a second substrate mixture comprising removed modifying agent, substrate and additional mixing agent;

D. Agitating the second substrate mixture under a partial vacuum to form a semi-crystalline coating of the removed modifying agent on the substrate surface; and E. Recovering the substrate with the modifying agent coating.

In one embodiment the modifying agent and mixing agent are mixed together prior to contact with the substrate. In one embodiment, the modifying agent and mixing agent are contacted in any order with the substrate. In one embodiment the modifying agent is made in situ in either the preparation of a pre-mix of modifying agent and mixing agent, or during its contact with the substrate. In one embodiment the substrate is also contacted with an optional binding agent. In one embodiment, the process includes the additional step of increasing the temperature under which the second substrate mixture is agitated prior to recovering the substrate with modifying agent crystals attached to it surface. In one embodiment, the modifying agent is a poly(sulfonyl) azide. In one embodiment, the substrate is a polyolefin, e.g., a polyethylene, polypropylene, polystyrene, etc. In one embodiment, the mixing agent is an organic polar solvent, e.g., methylene chloride, chloroform, toluene, acetone, etc. In one embodiment, the invention is the substrate-with-attached modifying agent made by the process described in this paragraph.

The process of this invention produces a modifying agent coating that contains crystals that are small, e.g., 1 to 50 microns (μm), relative to the crystal size produced by conventional modifying agent coating processes, e.g., 200 to 600 μm. Moreover, these small crystals adhere strongly to the carrier (substrate). As such, this invention produces very stable modifying agent/carrier compositions from which few, if any, modifying agent crystals, crystallites or particles detach, attrit or break off from the carrier during packaging, shipping or further processing. Reduced delamination or attrition of modifying agent crystals, crystallites or particles, which tend to be relatively pure, reduces the likelihood that shock sensitive modifying agent particles or particulates will collect in processing equipment. In one practice of this invention, a stable, conveniently transported, composition of modifying agent/carrier, e.g., azide/polyolefin, particles is produced.

In one embodiment the modifying agent-coated substrates made by the process of this invention are used to modify a bulk polyolefin, typically by blending a relatively small amount of the modifying agent-coated substrates into a bulk polyolefin. The modifying agent, e.g., a coupling agent, will couple individual polyolefin molecules together, and thus modify the rheological properties of the bulk polyolefin, e.g., increase its viscosity. In one embodiment the substrate itself is a polyolefin and the modifying agent coating comprises a coupling agent such as a poly(sulfonyl) azide. The poly(sulfonyl) azide is attached to and substantially uniformly distributed upon the exposed surfaces of a polyolefin particle. The azide is attached to the surface of the polyolefin as a stable coating or layer. For purposes of the invention, an exposed surface includes a surface within an opening of a porous material so that "exposed" is not limited to the exterior surfaces of the particle.

In one embodiment of this invention, the carrier is a polyolefin, e.g., a polyethylene, polypropylene, polystyrene, etc., and it acts as a phlegmatizer for a poly(sulfonyl) azide coupling agent.

In one embodiment, the invention is a modifying agent bearing substrate made by the process described above in combination with a couplable or crosslinkable polymer.

In one embodiment, the substrate is inorganic particles of at least one of talc, silica, calcium carbonate, titanium dioxide, clay and the like. In one embodiment, the substrate is a particulate polymer other than a polyolefin polymer, e.g., poly(ethylene) terephthalate (PET), acrylonitrile-butadiene-styrene copolymer (ABS), styrene-acrylonitrile copolymer (SAN), natural rubber, etc., or a mixture of such polymers. In one embodiment the substrate is a physical mixture or blend of one or more particulate polymer (olefin and/or non-olefin) and one or more inorganic particles.

DETAILED DESCRIPTION OF THE INVENTION

Figure 1:
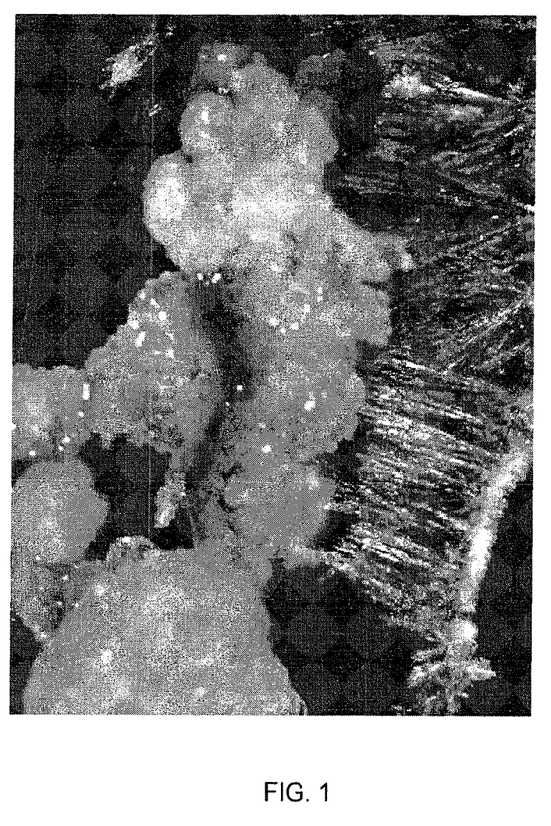
FIG. 1 is a photomicrograph that shows bis(sulfonyl) azide (BSA) crystallites that result from the direct precipitation of BSA in the absence of a particle substrate. BSA is precipitated in both crystal form (the striations on the right) and amorphous form (the clumps on the left). Both forms of the BSA were precipitated from solution by evaporation of a solvent. This micrograph shows the size of crystallites that can result if the process of this invention is not employed. The scale of this figure is the same as that of FIGS. 2 and 3.
Figure 2:
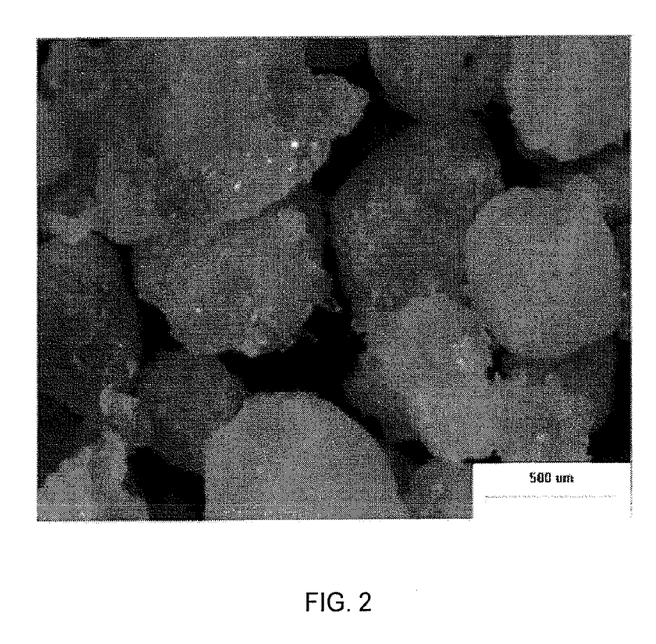
FIG. 2 is also a photomicrograph of BSA crystals, but these crystals have been deposited from solution onto polypropylene particles. Large clumps of BSA are evident, and these clumps, or fragments of these clumps, can be easily eroded from the polypropylene particles. In this case the precipitation was not carried out in accordance with the method of this invention. This is an example of a case where a secondary wash was not used to redistribute the BSA to reduce the number and/or size of protruding crystallites, nor was a binder present to make the coating amorphous.
Figure 3:
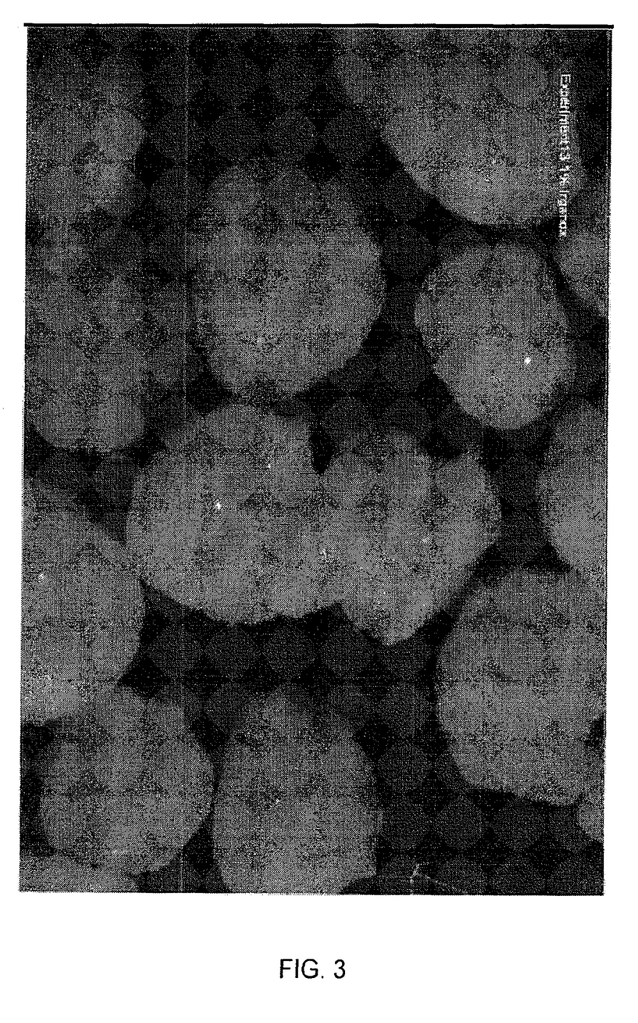
FIG. 3 is a photomicrograph of BSA deposited upon the same kind of polypropylene particles as those used in FIG. 2 but in this instance, the BSA was re-coated according to the process of this invention (Example 2). In this instance a thin, uniform coating of BSA on the polypropylene is apparent, and the coating is without protruding crystallites that can erode from the particles.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt flow rate (MFR), etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, reagent concentrations, particle size and various temperatures and other process ranges.

"Modifying agent" and like terms mean a chemical compound that contains at least one reactive group that is capable of forming a nitrene or carbene group that is capable of inserting itself into a carbon-hydrogen bond of a CH, CH2, or CH3 group, both aliphatic and/or aromatic, of a polymer chain. Activation of the modifying agent is typically accomplished with heat, sonic energy, radiation or other chemical activating energy.

"Coupling agent" and like terms mean a modifying agent that contains at least two reactive groups that are capable of forming a nitrene or carbene group that is capable of inserting itself into a carbon-hydrogen bond of a CH, CH2, or CH3 group, both aliphatic and/or aromatic, of a polymer chain. The reactive groups together can couple or crosslink polymer chains. In the practice of this invention, preferred coupling agents include the poly(sulfonyl) azides, particularly bis(sulfonyl azide).

"Nitrene group" and like terms mean a compound having the structure R—N, where N is a nitrogen capable of reacting with a polymer chain by inserting into the carbon-hydrogen bonds of CH, $CH_2$, or $CH_3$ groups, both aliphatic and/or aromatic, of a polymer chain. The nitrogen most preferred for inserting into the carbon-hydrogen bond is believed to have two lone pairs of electrons. R may be any atom or atoms that do not adversely interfere with the nitrogen inserting into the above-described carbon-hydrogen bond.

"Carbene group" and like terms mean a compound having a structure R—C—R' where C is carbon capable of reacting with a polymer chain by inserting into the carbon-hydrogen bonds of CH, CH2 or CH3 groups, both aliphatic and/or aromatic, of a polymer chain. The carbon most preferred for inserting into the carbon-hydrogen bond is believed to have one lone pair of electrons. R and R' are independently any atom or atoms that do not adversely interfere with the carbon inserting into the above-described carbon-hydrogen bonds.

"Phlegmatizing" and like terms mean a process for reducing the shock sensitivity of a reactive chemical or chemical species by mixing or combining the reactive chemical or chemical species with an inert or less reactive chemical or chemical species.

"Molecular melt" and like terms mean an at least partially amorphous blend, at room temperature, of a modifying agent and a binding agent, optionally also containing other additives. Both the modifying agent and the binding agent, if used, are at least partially contained in the amorphous phase of the blend. A molecular melt is sometimes referred to as a precipitated solid solution.

"Mixing agent" and like terms mean a compound that will dissolve or disperse a modifying agent or a binding agent.

"Binding agent" and like terms mean types or classes of compounds that are capable of being used to enable or enhance the attachment of a modifying agent to a substrate. Binding agents are particularly useful in enabling or enhancing the attachment of a modifying agent to a substrate when the substrate has a BET surface area of less than 1 square meter per gram ($m^2/g$). One class of preferred binding agent is the antioxidants.

"Antioxidant" and like terms mean a chemical compound that minimizes the oxidation that can occur during the processing of polymers. The term also includes chemical derivatives of the antioxidants. The term also includes chemical compounds, as described later in the description of the antioxidant, that interact with the modifying agent to form a complex.

"Target polymer" and like terms mean a polymer that is intended to be coupled through the action of the modifying agent. The target polymer can be any polymer that contains CH, $CH_2$, or $CH_3$ groups, aliphatic or aromatic, of a polymer chain. Preferably, the target polymer is a polyolefin, e.g., polyethylene, polypropylene, polystyrene, etc.

"DSC" means differential scanning calorimeter or differential scanning calorimetry analysis, depending upon the context in which it is used. DSC is one method for measuring the crystallinity of a polymer.

"DPO-BSA" means 4,4'-oxydibenzenesulfonyl azide also known as simply "BSA."

"Contact zone" and like terms mean a space in which two or more of the substrate, modifying agent, optional binding agent and liquid mixing agent are brought into contact with one another. The space is contained within a vessel that typically can be opened and closed to its external environment. The vessel is typically designed for both pressurization and de-pressurization, i.e., to hold both a positive pressure and a vacuum or partial vacuum, and it may be designed for batch, semi-batch, continuous or semi-continuous operation.

Substrates

Any material upon which the modifying agent can coat can be used as the substrate in the practice of this invention. Typically, the substrate is of the same composition as the target polymer. Examples of substrates include but are not limited to inorganic particles such as talc, silica, calcium carbonate, titanium dioxide, clay and the like; particulate non-olefin polymers such as polyesters, e.g., PET, rubbers, e.g., ABS, SAN and natural rubber, polyethers, polycarbonates, polyamides and the like; and olefin polymers such as polymers based on ethylene, propylene and other olefins and for purposes of this disclosure, styrene, substituted styrene and/or ethylene styrene interpolymers are included within the term "olefins", as disclosed in U.S. Pat. No. 5,703,187. In one embodiment the substrate is a physical mixture or blend of one or more particulate polymer and one or more inorganic particles. Preferred substrates (and target polymers) are polyolefin-based polymers, including propylene homopolymer, random and impact copolymers of propylene, and polyethylene polymers, such as high density (HDPE), medium density (MDPE), linear low density (LLDPE) and low density (LDPE) polyethylenes. Such polymers include terpolymers, tetrapolymers, block copolymers and higher order polymers of propylene, ethylene and other olefins, and optionally, for example, dienes and/or trienes.

Impact propylene copolymers are commercially available and are well within the skill in the art, for instance, as described by E. P. Moore, Jr. in Polypropylene Handbook, Hanser Publishers, 1996, page 220-221 and U.S. Pat. Nos. 3,893,989 and 4,113,802. The term "impact copolymer" refers to heterophasic propylene copolymers where polypropylene is the continuous phase and an elastomeric phase is uniformly dispersed throughout it. The impact copolymers result from an in-reactor process rather than physical blending. Usually the impact copolymers are formed in a dual or multi-stage process, which optionally involves a single reactor with at least two process stages, or optionally multiple reactors. Advantageously, the impact copolymers have at least 5 weight percent, preferably at least 10, preferably up to 40, more preferably up to 25 weight percent, and most preferably up to 20 weight percent polymeric units derived from ethylene. Illustrative impact copolymer propylene polymers include those available from The Dow Chemical Company under the trade designations Dow C104-01 PP, Dow C105-02 PP, Dow C107-04 PP, and Dow DC-I1 PP propylene impact copolymers having melt flow rates of 1, 2, 4 and 0.8 g/10 min, respectively, under a weight of 2.16 kg at a temperature of 230° C.

The morphology of the particulate substrates used in the practice of this invention can vary widely, and includes pellets, tablets, ground materials, flakes and irregular-shaped particles. The size of the substrate particle can have a substantial impact on the relative need or desirability for using a binding agent to help attach the modifying agent to the surface of the substrate particle. For particles measuring greater than (>)1.0 square meter/g (m²/g) of specific Brunauer Emmett Teller (BET) surface area, the surface area of the particles is sufficient to attach the coating as a robust coating at levels of up to 20 percent by weight (wt %) coating. For particles with a specific surface area less than (<)1.0 m²/g BET, or coating levels higher than 20 wt %, a binding agent is a significant aid in achieving a robust attachment of the modifying agent to the particle surface and, in turn, to enhancing the wear resistance of the coating.

Modifying Agent

As described above, the modifying agents are chemical compounds that contain at least one reactive group capable of forming a carbene or nitrene group. A coupling agent is a modifying agent that contains at least two reactive groups capable of forming a carbene or nitrene group. In one embodiment the modifying agent is in a solution or dispersion with a mixing agent either by itself or in combination with one or more other modifying agents and/or binding agents. In one embodiment the modifying agent is made by creating it in situ by reacting precursors of the modifying agent in the presence of the binding agent and/or substrate.

Examples of chemical compounds that contain at least one reactive group capable of forming a carbene group include, but are not limited to, diazo-alkanes, geminally-substituted methylene groups, ketenes and metallo-carbenes. Examples of chemical compounds that contain at least one reactive group capable of forming a nitrene group include, but are not limited to, silyl azides, phosphazene azides, sulfonyl azides, formyl azides, salts of N-chlorosulfonamides, N,N-dichlorosulfonamides and 2-trialkyl-1-sulfonylhydrazides (inner salt).

In one embodiment of the invention, the target polymer is a polyolefin and the coupling agent is a poly(sulfonyl azide). A poly(sulfonyl azide) is any compound having at least two reactive groups (the sulfonyl azide groups ($-SO_2N_3$)) which are reactive with the polyolefin. Preferably the poly(sulfonyl azide)s have a structure X—R—X in which each X is $-SO_2N_3$ and R represents an unsubstituted or inertly-substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide. Examples of atoms or groups that may be inertly substituted into R include, but are not limited to, fluorine, aliphatic or aromatic ether, siloxane as well as sulfonyl azide groups in which more than two polyolefin chains are to be joined. R is suitably aryl, alkyl, alkylaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl)azides include but are not limited to such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures of two or more such compounds. Preferred poly(sulfonyl azide)s include oxy-bis(4-sulfonylazidobenzene), 2,7-naphthalene bis(sulfonyl azide), 4,4'bis(sulfonyl azido)biphenyl, 4,4'-diphenyl ether bis(sulfonyl azide) and bis(4-sulfonyl azidophenyl)methane, and mixtures of two or more such compounds.

Binding Agents

The binding agents used in the practice of this invention include antioxidants and chemical derivatives of such antioxidant. Preferably, the binding agent is not a phosphite-containing compound or a compound containing a phosphorous in the +3 oxidation state, since these compounds tend to be highly reactive with the many of the coupling agents that can be utilized in the practice of this invention. An example of a phosphite-based antioxidant is tris(2,4-di-tert-butylphenyl) phosphite available from Ciba Specialty Chemicals Company under the trade name Irgafos 168.

The binding agents also include compounds that can form a complex with the modifying agent which does not adversely interfere with the utilization of the modifying agent, e.g., antioxidants such as Irganox 1010, Irganox 1076, etc. In this embodiment the compounds utilized for the binding agent act as antioxidants when the coated substrate is added to the target polymer.

Other binding agents include very low density polyethylene (density of less than 0.90 g/ml, preferably less than 0.875 g/ml), starch, polyols, cellulosics and polyethers.

The binding agents preferably have the capability of existing in an amorphous state. Also, the modifying agent should be chemically and sterically compatible with the binding agent so as to form a partially amorphous complex or solid solution in which the reactive groups of the modifying agent do not appreciably adversely react with the binding agent under conditions of the coating process.

Examples of classes of antioxidants that can be utilized as the binding agent include compounds which can function as either carbon radical and/or oxygen radical scavengers, such as phenolic compounds and their derivatives, hindered amines, amine hydroxides, thio-ester compounds, and hindered phenolic compounds. Additionally, lactones, which can function as both carbon radical scavengers and oxygen radical scavengers, are also viable antioxidants that can be used in the practice of this invention. Mixtures of antioxidants can also be used. An example of a lactone suitable for use in the invention is 5,7-bis(1,1-dimethylethyl)-3-hydroxy-2(3H)-benzofuranone reaction products with o-xylene (Chemical Abstracts #181314-48-7), which is sold by the Ciba Specialty Chemicals Company, under the trade name IRGANOX HP-136.

The phenolic-based antioxidants and their derivatives and the various lactones are preferred binding agents. Examples of phenolic-based antioxidants and substituted phenolic-based antioxidants include 2,2'-methylene bis(6-(1-methylcyclohexyl)-p-cresol and 2,6-ditertiary butyl-4-methyl phenol. These classes of antioxidants are capable of forming highly amorphous (less than 10% crystallinity) molecular melts and are also capable of forming molecular melts having a high molar ratio of coupling agent to antioxidant (greater than 1:1). More preferably, the hindered phenolic compounds are utilized to form a molecular melt. An example of a hindered phenolic compound suitable for use in the invention is tetrakis [Methylene (3,5-di-t-butyl-4-hydroxyhydrocinnamate)] which is available from the Ciba Specialty Chemicals Company under the trade name Irganox 1010 (sometimes referred to as "I-1010").

Mixing Agents

Mixing agents include but are not limited to benzene, alkylated benzenes (e.g., toluene, xylene, etc.), halogenated alkyls (e.g., methylene chloride, chloroform, etc.), ketones (e.g., acetone, methyl ethyl ketone, methyl isobutyl ketone, etc.), ethers, polar solvents in general, and other compounds with good solubility or dispersing effectiveness for the modifying agent and/or binding agent with a vapor pressure greater than 300 millimeters of mercury (mm/Hg) at or below 100° C. Mixing agents can be used alone or in combination with one another and in those embodiments in which a binding agent is used, the mixing agent for the binding agent can be the same or different than the mixing agent for the modifying agent. Preferably the mixing agent for the binding agent is the same as the mixing agent for the modifying agent.

Additives

Other compounds, in addition to the modifying agent and binding agent, may optionally be present in the coating. Representative of these other compounds are plasticizers, flow agents, pigments, dyes, UV-absorbers, antioxidants (in addition to those that can also serve as binding agents), fragrances, etc. Preferably, the additional compounds will not adversely react with either the modifying agent or the binding agent and will not cause the crystallite size of the coating to rise significantly. However, in some instances, for example, where blocking (i.e., particles sticking together) of the coating is a concern, it may be desirable to add additional compounds which will increase the resulting crystallinity of the coating. Alternatively additional fine particles, either inorganic or polymer, can be added to reduce the blocking tendency of the coated particles. These additional fine particles may be incorporated into the coating process or be added as a subsequent over-coating.

Although compounds containing phosphorous in the +3 oxidation state may be added to the molecular melt in limited quantities to the limit that that they do not adversely react with the modifying or binding agent, preferably the coating does not contain any phosphite-based compounds (such as a phosphite-based antioxidant) since these phosphite-based compounds may adversely react with the modifying or binding agent in the molecular melt. In general the additional compounds added to the coating should be polymer additives that are typically added during the polymerization process or polymer processing process. Examples of the additional compounds that may be present in the coating include:

Internal lubricants, such as, polyethylene glycol (PEG), polypropylene glycol (PPG), calcium stearate and glycerol mono stearate (GMS);

Compatibilizing agents, such as, titanium di(dioctylpyrophosphosate)oxyacetate, di(dioctylpyrophosphosate) ethylene titanate, isopropyl tricumylphenyl titanate, tetra(2,2-diallyloxymethyl)butyl, di(ditridecyl)phosphio-zirconate, glycidoxypropyl-trimethoxysilane;

Release agents, such as oleamide, stearamide, zinc stearate, erucamide, aminopropyl-trimethoxysilane, bis(glycidoxypropyl)tetramethyldisiloxane, bis-(3-(triethoxysilyl)-propyl)tetrasulfide, bis(trimethylsilyl)urea;

Plasticizers, such as tri-isooctyl trimellitate. epoxidized soybean oil, di(2-ethylhexyl)-adipate, acetyl triethyl citrate, acetyl tributyl citrate, di-isocetyl adipate, triethyl citrate, polybutene, oleyl palitamide, N-stearyl erucamide, distearyl thiodipropionate;

Ultraviolet stabilizers, such as 2-hydroxy-4-n-octoxybenzophenone; 2-hydroxy-4-methoxybenzophenone; sodium dicyclohexyl sulfosuccinate; and Catalyst neutralizers, such as metal stearates (e.g., calcium stearate), hydrotalcites, calcium lactate and metal oxides; and combinations of two or more of these additives.

Use of Modifying Agents Attached to a Substrate

The following discussion specifically addresses the reaction of a coupling agent with a polyolefin, but one of ordinary skill in the art will realize that the teaching also applies to the reaction of any modifying agent with any other target polymer of interest.

The reactive groups of the coupling agent are typically activated by heat, sonic energy, radiation or other chemical activating energy to generate nitrene and/or carbene groups which are capable of reacting with the target polymer. When the coupling agent reacts with a polyolefin, at least two separate polyolefin chains are advantageously joined and the molecular weight of the polymer chain is increased. In one embodiment of the invention, the coupling agent is a bis (sulfonyl azide) and two polyolefin chains are advantageously joined.

One method for activating a coupling agent is to heat the coupling agent to cause decomposition of the reactive groups to form carbene and/or nitrene groups. Each coupling agent will have a characteristic temperature profile under which it decomposes. This temperature profile can be determined by DSC analysis. Each coupling agent will have a peak or a series of peak decomposition temperatures, which correspond to the decomposition of a particular reactive group. For example, a DSC thermogram of the bis(sulfonyl azide) of diphenyl oxide shows a broad exothermic peak that begins about 130° C., peaks at about 185° C. (i.e., the peak decomposition temperature), and is complete by about 220° C. The total amount of energy released due to decomposition of the sulfonyl azide groups in the DPO-BSA is about 1500 Joules/gram (J/g).

However, most coupling agents will also decompose at temperatures less than the peak decomposition temperature. Preferably, the target polymers and the molecular melt are well mixed as the reaction between the coupling agent and the target polymer takes place. In some embodiments of the invention, the mixture of molecular melt and target polymer is maintained well below the peak decomposition temperature until the desired time to initiate the coupling reaction.

Those skilled in the art will recognize that the reactivity of the coupling agent, the coupling agent and the desired or predetermined rheology or amount of chain coupling determine the amount of coupling agent to be used. Determining this amount is within the skill in the art. In this aspect of the invention, formation of substantially crosslinked networks is to be avoided because the resulting material would be intractable. In this instance, the poly(sulfonyl azide) is preferably limited to that amount which results in chain coupled or rheology modified, (but not substantially crosslinked) polyolefin. However, some applications will tolerate a certain amount of crosslinking (such as foam applications). In general the level of azide used preferably is less than 1.6 mole coupling agent per mole of target polymer. For films preferably less than 0.5 wt %, more preferably less than 0.20 wt %, most preferably less than 0.10 wt % of the preferred coupling agent poly(sulfonyl azide) based on the total weight of polyolefin, preferably polypropylene or polypropylene/ethylene copolymer blend.

As with rheology modification, those skilled in the art will recognize that the reactivity, the coupling agent used and desired degree of cross-linking will determine the amount of coupling agent used. However, unlike rheology modification, for cross-linking applications, it is necessary to add sufficient coupling agent to form cross-linked networks. This requires a higher concentration of reactive groups capable of forming carbene or nitrene groups per each polymer molecule. Typically, the molar ratio of reactive groups to target polymers should be from 0.9 to 6.0.

In some embodiments coupling agents having greater than two reactive groups per coupling agent molecule are used. This will reduce the amount of coupling agent that must be used. Also, for cross-linked applications, typically the amount of antioxidant added to the target polymer is minimized. As such, these applications typically utilize a molecular melt with a relatively higher molar ratio of coupling agent to antioxidant than the molecular melt typically utilized for rheology modification.

Process

In one embodiment the substrate mixture, e.g., a mixture comprising the substrate, modifying agent, mixing agent and optionally, binding agent and/or additives, has the characteristics of a molecular melt (e.g., U.S. Pat. No. 6,776,924). The molecular melt may be formed by co-precipitating the modifying agent and blending agent from a common mixing agent, or any other process that will provide an at least partially amorphous coating on the surface of the substrate. The mole ratio of modifying agent to binding agent is typically from about 1:20 to about 100:1, more preferably from about 1:5 to about 50:1, and yet more preferably from 1:3 to about 10:1. Various additives can be present in the coating that are not necessary to the coating itself but rather are present to impart desired features or properties to the target polymer system. These include, among others, antioxidants, plasticizers, flow agents, UV-absorbers, fillers and the like.

In some embodiments the coating process is continuous while in other embodiments the coating process is batch.

Any particle handling equipment that accomplishes the attachment, e.g., coating, of the modifying agent onto the surface of the substrate particle is suitable for this invention. "Coating" as that term is used in this disclosure is to be broadly understood to mean but not to be limited to the application in any manner, e.g., contacting, depositing, "salting out," precipitating, etc., of one material to another such that the materials adhere to one another. Preferred equipment for accomplishing coating is any apparatus which provides sufficient mixing of the modifying agent solution and the substrate particles, with adequate solvent removal, heat transfer and temperature control. Advantageously, practice of the invention takes place in such devices as a vacuum dryer, a vacuum V-blender, a rotary drum coater, a Nauta-style dryer, a fluidized bed coater, a spouted bed coater, a Wurster coater or other such particle coating equipment. The term coater is used for its broadest meaning to include equipment or apparatuses which allow for contacting of a solute in solution, or a particle in dispersion, etc., with a particulate substrate to coat the substrate. Preferably the equipment is adapted and has systems for control of the pressure inside the vessel, potentially using high vacuum, and also allows for time sequencing or zone-sequencing of temperatures to allow the coated particles to experience different temperature histories along the drying path and during a drying cycle.

During the manufacture of the coated substrate, it is important to minimize the chance that dry crystalline modifying agent is present in a purified form, particularly if the modifying agent is shock sensitive. Phlegmatization can be achieved by dilution of the modifying agent with non-shock sensitive materials. Phlegmatization is achieved when the total energy released (per weight of coated substrate) by the coated substrate particles in a DSC is low enough that the coated substrate is not shock sensitive as taught by Yoshida in Kogyo Kayaku, Vol. 48 (No. 5), 1987, pp 311-316. Preferably, the total energy released in a DSC falls below the shock sensitivity line as shown in the Yoshida Correlation described in the same reference.

The attributes of the coating according to the method of this invention minimize and/or prevent the segregation of the modifying agent (and binding agent when that is used) during the shipping and handling of the coated substrate particle.

If the binding agent is an antioxidant, then it will at least partially protect the modifying agent in the molecular melt from reacting with itself and other compounds, such as compounds containing phosphorous in a +3 oxidation state that may adversely react with the modifying agent. By protecting the modifying agent, the antioxidant will increase the percentage of modifying agent that is available for reaction with the target polymer. This will increase the efficiency of the modifying agent, i.e. less will be wasted by side reactions.

In one embodiment of this invention, a modifying agent in solution is contacted with a particle substrate in a jacketed blender, followed by heating of the jacket and vacuum purging of the blender, during which the solvent is substantially removed. A second dosing of solvent is added to the blender and mixed with the substrate/modifying agent admixture for a time, during which the mixture cools. Subsequently, the jacket of the blender is re-heated at the same time a vacuum purge is applied and the solvent is again substantially removed.

The coating process may also take place in multiple pieces of equipment. These equipment pieces may be identical, or different from each other as the coating process warrants. Sequential coating and drying steps may be accomplished in a single unit operation or in several staged unit operations with transfer of particles from one stage to the next. Transfer of particles is preferably accomplished with low velocities and minimal particulate collisions to minimize damage to the coating during processing. The coating process may occur batchwise or continuously.

In one embodiment the mixing agent is removed to less than 5 wt % of the remaining admixture of substrate and modifying agent and, optionally, binding agent and additives. In one embodiment the mixing agent is removed to less than 1 wt % of the remaining admixture. In other embodiments, the mixing agent is removed to less than 0.5, or less than 0.1, or less than 0.05, or less than 0.0.01, wt % of the remaining admixture.

In one embodiment of the invention the modifying agent is BSA and the temperature at which the modifying agent, a mixing agent and substrate, and optionally binding agent and additive, are mixed and the mixing agent is removed or extracted, and the subsequent handling of the coated substrate is kept to less than 80, preferably less than 60, more preferably less than 50 and event more preferably less than 40° C.

In one embodiment of the invention, the weight percent of modifying agent coated on the substrate is 0.0001 to 50, preferably 0.01 to 20 and more preferably 0.1 to 10, wt %. One skilled in this art will understand that the optimal range is a function of the morphology of the substrate particle, and is bounded at the upper limit by practical handling considerations due to the known shock sensitivity issues of the modifying agent.

In one embodiment of the invention, the mixing agent is the reaction medium in which the modifying agent is produced from its precursor molecules. In one embodiment, this reaction medium is transferred directly from the reactor in which the modifying agent is made to the vessel in which the modifying agent is admixed with the particulate support.

In further embodiments of the invention, the solvent is removed via evaporation. The evaporation may be induced by adding heat via convection through a jacket on the vessel, or by injecting heated, dry inert gas into the vessel to promote evaporation. The substrate particles to be coated are preferably agitated during solvent evaporation in order to prevent agglomeration of the substrate particles due to bridging of the coating between particles.

In one embodiment, solvent evaporation is performed at a pressure less than the vapor pressure of the solvent at the temperature of the process, preferably under at least a partial vacuum.

In one embodiment, solvent evaporation is performed at a temperature less than the decomposition or softening temperature of the modifying agent and the substrate.

When the coating process is a continuous process, the modifying agent containing solution may be sprayed on to a moving bed of the substrate particles so that the bed surface is renewed and the particles are evenly coated. In this case, the steps outlined in the coating process may be carried out in more than one vessel or piece of equipment. Likewise, at least one step may be carried out in one piece of equipment while at least one more step may be carried out in another, etc., until all of the steps have been accomplished. Various pieces of equipment may be used to facilitate the renewal of the surface of the bed and therefore the coating process. For example, a rotating drum or a fluidized bed may be used to renew the surface of the bed, an auger may be used to agitate the bed to renew the surface of the bed, or a belt conveyor may be used to renew the surface of the bed.

Whether the process is a continuous process or a batch process, in some embodiments of the invention the final solvent removal stage may be done in a purged hopper. In such an embodiment, the coated particles, having been sufficiently dried so as to not stick together, may be loaded into a purged hopper or other holding vessel into which an inert gas is passed over the coated particles to allow the final levels of solvent to be removed to a level that is acceptable for downstream applications. In some embodiments of the invention, the inert gas is heated prior to contact with the coated particles, but not to a temperature at which the gas has an adverse impact upon the coated particles.

If the coating process is a batch process, then the modifying agent containing solution is mixed with the substrate particles in a vessel and the mixing agent is removed by evaporation on a batch basis. This is usually followed by at least one subsequent wash of mixing agent and at least one subsequent evaporative removal of the mixing agent essentially to dryness.

The vessel may be a jacketed vacuum dryer such as a double cone dryer, or Nauta dryer, or a rotary drum dryer, or paddle dryer or ribbon blender dryer.

In some embodiments of the invention, an inert purge is used to reduce the local mixing agent vapor pressure so as to enhance the evaporative rate of the mixing agent.

In one embodiment the invention is a process for combining an azide compound with a polyolefin particle in which the azide compound is produced in a reactor as a solution and that solution is mixed with the polyolefin particles and the solvent is removed using a plurality of subsequent solvent wash steps and solvent removal steps to produce an azide coated particle.

In other embodiments of the invention, a binding agent is added to the mixing agent during wash steps or is added with the initial modifying agent.

In other embodiments the modifying agent is precipitated or co-precipitated under conditions at which the resulting crystallite size is less than 50 microns.

In other embodiments the substrate and modifying agent solution mixture is cooled such that the modifying agent precipitates out of solution onto the particle substrate so as to coat it.

In other embodiments a co-precipitant is used to aid in the cooling precipitation of the azide from the solvent.

The invention is described more fully through the following examples. Unless otherwise noted, all parts and percentages are by weight.

EXAMPLES

Example 1

Materials

Random propylene-ethylene copolymer powder (1760 g) with a 4% ethylene content, 10 g/10 min melt flow rate (MFR by ISO 1133 measured at 230° C./2.16 kg), and a surface area of 0.66 $m^2/g$.
Methylene Chloride ($CH_2Cl_2$, 500 g)
BSA/$CH_2Cl_2$ solution at 20% (1000 g)
Irganox 1010 (40 g)
Procedure:

All materials and equipment (double cone mixer 0.5 ft$^3$) are at a temperature of 28° C.
1. Purge mixer with N$_2$ to displace O$_2$
2. Add Polypropylene under constant N$_2$ flow.
3. Add suspension of BSA/CH$_2$Cl$_2$ and CH$_2$Cl$_2$ with dissolved Irganox1010 under constant N$_2$ flow.
4. Close Mixer.
5. Shut off N$_2$ flow.
6. Mix for 30 minutes; CH$_2$Cl$_2$ starts to evaporate; pressure increases to 5-7 psig; mixer jacket temperature at 28-29° C.
7. Jacket of double cone mixer is cooled with water which runs through a heat exchanger sitting in ice water. Jacket temperature slowly decreases,
8. Vacuum of 10 inches of Hg gauge (0.673 bar) applied and held constant.
9. 30 minutes of mixing.
10. 40 minutes of mixing with N$_2$ flow. Vacuum continuously applied to dry CH$_2$Cl$_2$.

This example illustrates the invention in which the substrate has a low surface area, i.e., less than 1 m$^2$/g, and requires the use of a binding agent, here Irganox 1010 at a level such that the coating contains more than 10% by weight of the antioxidant.

Example 2

Materials

Polyethylene (GER1813, lot 2286 screened to 16-28 U.S. mesh, 2000.5 g) with a density of 0.96 g/cc, a melt index (I$_{20}$) of 0.25-0.35 dg/min (ASTM D1238 at 190° C./21.6 kg), and a surface area of 1.325 m$^2$/g.
1$^{st}$ aliquot of Methylene Chloride (2527.3 g)
BSA/CH$_2$Cl$_2$ solution at 25 wt. % BSA (881.5 g)
Irganox 1010 (0.8026 g)
2$^{nd}$ aliquot of Methylene Chloride (3401.8 g)
Procedure:
Initial temperature of all materials and equipment (double cone mixer 0.5 ft$^3$) are at a temperature of 15° C.
1. Add Polyethylene to open mixer. Close mixer and purge mixer under vacuum with N$_2$ to displace O$_2$.
2. Open mixer and add suspension of BSA/CH$_2$Cl$_2$ and CH$_2$Cl$_2$ with dissolved Irganox1010. Close Mixer. Shut off N$_2$ flow.
3. Mix for 20 minutes under slight vacuum (590 mm Hg absolute); CH$_2$Cl$_2$ starts to evaporate. Mixer jacket temperature maintained at 20° C.
4. Increase jacket temperature to 40° C. and reduce pressure to 330 mm Hg absolute.
5. After 8 minutes open valve to vacuum pump. Reduce pressure to 40 mm Hg absolute.
6. After 12 minutes cool jacket of double cone mixer to 20° C.
7. After jacket temperature registers 20° C. (~9 min), 2$^{nd}$ aliquot of CH$_2$Cl$_2$ is added to mixer to recrystallize the coating.
8. Mix for 20 minutes under slight vacuum (560 mm Hg absolute); mixer jacket temperature maintained at 20° C.
9. Increase jacket temperature to 40° C. and open valve to vacuum pump. Mix for one hour. Pressure reduced to 125 mm Hg absolute.
10. Turn off rotation of mixer and shut off vacuum pump. Feed N$_2$ to mixer until atmospheric pressure realized. Drain contents of mixer to sample container.

Resulting powder is free flowing white powder, dry to the touch. BSA assay indicates 9.7 wt % (±0.4%) determined by DSC. The Irganox level is at 400 ppm which is the antioxidant level used for the substrate polymer to protect its quality during storage. Also, at a 0.4% level relative to the BSA, it is at much too low a level to provide any binding effect for the BSA coating. As indicated above, a binding agent must be added at greater than 5% of the modifying agent in order to impact the coating properties.

Example 3

Materials

Random propylene-ethylene copolymer powder screened to 16-28 U.S. mesh with a 3.7% ethylene content, 35 g/10 min MFR (ISO 1133 measured at 230° C./2.16 kg), and a surface area of 1.4 m$^2$/g.
1$^{st}$ aliquot of Methylene Chloride (611 g)
BSA/CH$_2$Cl$_2$ solution at 19 wt % BSA (1100 g)
2$^{nd}$ aliquot of Methylene Chloride (1700 g)
Procedure:
Initial temperature of all materials and equipment (double cone mixer 0.5 ft$^3$) are at a temperature of 20° C.
1. Add polypropylene to open mixer. Close mixer and purge mixer under vacuum with N$_2$ to displace O$_2$.
2. Add solution of BSA/CH$_2$Cl$_2$ and remaining CH$_2$Cl$_2$.
3. Mix for 15 minutes under slight vacuum (630 mm Hg absolute); CH$_2$Cl$_2$ starts to evaporate. Mixer jacket temperature is 20° C.
4. Gradually reduce pressure to 250 mm Hg absolute and mix for 45 minutes.
5. Increase jacket setpoint temperature to 40° C. and mix for 20 minutes after the temperature is achieved. Pressure is reduced to 120 mm Hg absolute.
6. Cool jacket of fouble cone mixer to 20° C.
7. After jacket temperature registers 20° C. (~45 minutes), add 2$^{nd}$ aliquot of CH$_2$Cl$_2$ to mixer to recrystallize the coating.
8. Mix for 15 minutes under slight vacuum (630 mm Hg absolute); mixer jacket temperature is maintained at. 20° C.
9. Gradually reduce pressure to 250 mm Hg absolute and mix for 45 minutes.
10. Increase jacket setpoint temperature to 40° C. and mix for 40 minutes after the temperature is achieved. Pressure is reduce to 120 mm Hg absolute.
11. Stop mixer rotation and shut off vacuum pump. Feed N$_2$ to mixer until atmospheric pressure achieved. Drain contents of mixer to sample container, Resulting powder is a free flowing, white powder that is dry to the touch. BSA assay shows 9.7 wt % as determined by high pressure liquid chromatography.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A process for attaching a modifying agent to a substrate surface, the process comprising the steps of:
    A. Contacting in an open contact zone and under a flow of inert gas a substrate that has a BET surface area of less than one square meter per gram (m$^2$/g) with a modifying agent, binding agent and a liquid mixing agent to form a substrate mixture;
    B. Closing the contact zone and stopping the flow of inert gas to the contact zone;

C. Agitating the substrate mixture under the inert gas in the closed contact zone to commence evaporation of the liquid mixing agent;

D. Reducing the temperature and pressure of the closed contact zone while continuing to agitate the substrate mixture; and E. Completing the substantial evaporation of the mixing agent from the substrate mixture by opening the contact zone and initiating an inert gas flow while continuing agitation of the substrate mixture and maintaining a reduced pressure.

2. A process for attaching a modifying agent to a substrate surface, the process comprising the steps of:

A. Contacting in an inert gas atmosphere a substrate with a modifying agent, an optional binding agent, and a liquid mixing agent to form a first substrate mixture;

B. Evaporating at least a part of the liquid mixing agent while agitating the first substrate mixture under an inert gas flow or a partial vacuum to form a semi-crystalline coating of modifying agent on the substrate surface;

C. Contacting the modifying agent semi-crystalline coating on the substrate surface with additional mixing agent to remove at least a portion of the coating from the substrate surface and to form a second substrate mixture comprising removed modifying agent, substrate and additional mixing agent;

D. Agitating the second substrate mixture under an inert gas flow or a partial vacuum to form a semi-crystalline coating of the removed modifying agent on the substrate surface; and E. Recovering the substrate with the modifying agent coating.

3. A process for attaching a modifying agent to a substrate surface, the process comprising the steps of:

A. Contacting in an inert gas atmosphere a substrate that has a BET surface area of at least one square meter per gram ($m^2/g$) with a modifying agent, an optional binding agent, and a liquid mixing agent to form a first substrate mixture;

B. Evaporating at least a part of the mixing agent while agitating the first substrate mixture under a partial vacuum to form a semi-crystalline coating of modifying agent on the substrate surface;

C. Contacting the modifying agent semi-crystalline coating on the substrate surface with additional mixing agent to remove at least a portion of the coating from the substrate surface and to form a second substrate mixture comprising removed modifying agent, substrate and additional mixing agent;

D. Agitating the second substrate mixture under a partial vacuum to form a semi-crystalline coating of the removed modifying agent on the substrate surface; and E. Recovering the substrate with the modifying agent coating.

4. The process of claim 1 in which the modifying agent is a poly(sulfonyl) azide.

5. The process of claim 1 in which the substrate comprises particles of at least one of an inorganic material and a particulate polymer.

6. The process of claim 5 in which the substrate comprises a polyethylene or polypropylene.

7. The process of claim 1 in which the binding agent is an antioxidant.

8. The process of claim 1 in which the mixing agent is a solvent for the modifying agent and has a vapor pressure at 100° C. of at least 300 mm of Hg.

9. The process of claim 1 in which the mixing agent is at least one of a haloalkyl, an aryl or substituted aryl, an aldehyde, a ketone or an ether compound.

10. The process of claim 2 in which the modifying agent is a poly(sulfonyl) azide.

11. The process of claim 2 in which the substrate comprises particles of at least one of an inorganic material and a particulate polymer.

12. The process of claim 2 in which the substrate comprises a polyethylene or polypropylene.

13. The process of claim 2 in which the binding agent is an antioxidant.

14. The process of claim 2 in which the mixing agent is a solvent for the modifying agent and has a vapor pressure at 100° C. of at least 300 mm of Hg.

15. The process of claim 2 in which the mixing agent is at least one of a haloalkyl, an aryl or substituted aryl, an aldehyde, a ketone or an ether compound.

16. The process of claim 3 in which the modifying agent is a poly(sulfonyl) azide.

17. The process of claim 3 in which the substrate comprises particles of at least one of an inorganic material and a particulate polymer.

18. The process of claim 3 in which the substrate comprises a polyethylene or polypropylene.

* * * * *